(12) United States Patent
Matsuzaki

(10) Patent No.: US 11,800,828 B2
(45) Date of Patent: Oct. 31, 2023

(54) WORKING VEHICLE

(71) Applicant: KUBOTA CORPORATION, Osaka (JP)

(72) Inventor: Yushi Matsuzaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/836,098

(22) Filed: Jun. 9, 2022

(65) Prior Publication Data

US 2022/0295685 A1    Sep. 22, 2022

Related U.S. Application Data

(63) Continuation of application No. PCT/JP2020/047951, filed on Dec. 22, 2020.

(30) Foreign Application Priority Data

Dec. 27, 2019  (JP) .............................. 2019-239888

(51) Int. Cl.
| | | |
|---|---|---|
| *A01B 69/00* | (2006.01) | |
| *A01B 69/04* | (2006.01) | |
| *A01B 63/14* | (2006.01) | |
| *B62D 6/00* | (2006.01) | |
| *B62D 49/06* | (2006.01) | |

(52) U.S. Cl.
CPC ............ *A01B 69/008* (2013.01); *A01B 63/14* (2013.01); *B62D 6/007* (2013.01); *B62D 49/06* (2013.01)

(58) Field of Classification Search
CPC ................................................... A01B 69/008
See application file for complete search history.

(56) References Cited

U.S. PATENT DOCUMENTS

| | | | |
|---|---|---|---|
| 2016/0360697 A1* | 12/2016 | Diaz ..................... | B60W 10/20 |
| 2018/0037223 A1* | 2/2018 | Goto ..................... | B60W 30/08 |
| 2018/0299894 A1 | 10/2018 | Takase et al. | |
| 2020/0019165 A1* | 1/2020 | Levandowski .. | G08G 1/096791 |

FOREIGN PATENT DOCUMENTS

| | | | | |
|---|---|---|---|---|
| CN | 107054368 A | * | 8/2017 | ............ B60W 10/18 |
| CN | 111343852 A | * | 6/2020 | ............ A01B 69/00 |
| JP | 3612583 B2 | * | 1/2005 | |
| JP | 2006320252 A | * | 11/2006 | |
| JP | 2017-047762 A | | 3/2017 | |

(Continued)

OTHER PUBLICATIONS

Official Communication issued in International Patent Application No. PCT/JP2020/047951, dated Feb. 22, 2021.

*Primary Examiner* — Shelley Chen
(74) *Attorney, Agent, or Firm* — KEATING AND BENNETT, LLP

(57) ABSTRACT

A working vehicle includes a traveling vehicle body, and an automatic driving controller to perform first automatic driving in which different operations relating to the traveling vehicle body are performed automatically and second automatic driving in which at least one of the different operations is set to be performed manually and another one or more of the different operations other than the at least one of the different operations set to be performed manually continue to be performed automatically.

8 Claims, 10 Drawing Sheets

(56) References Cited

FOREIGN PATENT DOCUMENTS

| | | | |
|---|---|---|---|
| JP | 2018-060261 A | 4/2018 | |
| JP | 2019-127118 A | 8/2019 | |
| JP | 2019127118 A * | 8/2019 | |
| JP | 2019-166942 A | 10/2019 | |
| JP | 2019-170197 A | 10/2019 | |
| JP | 2019170197 A * | 10/2019 | |
| JP | 2020152148 A * | 9/2020 | |
| JP | 2021003035 A * | 1/2021 | |
| JP | 6878344 B2 * | 5/2021 | |
| JP | 2021087384 A * | 6/2021 | |
| WO | 2018/173175 A1 | 9/2018 | |
| WO | WO-2020014683 A1 * | 1/2020 | ........ B60W 60/0011 |

* cited by examiner

Fig.5A

|  | First automatic driving | Second automatic driving |
|---|---|---|
| Operation of steering unit | Automatic | Manual |
| Operation of transmission | Automatic | Automatic |
| Operation of brake | Automatic | Automatic |
| Operation of raising/lowering device | Automatic | Automatic |

| Set automatic operation items | |
|---|---|
| Operation of steering unit | ☑ —J1 |
| Operation of transmission | ☑ —J2 |
| Operation of brake | ☑ —J3 |
| Operation of raising/lowering device | ☑ —J4 |
| . | . |
| . | . |
| . | . |
| | CANCEL  OK |

Set automatic operation items

| | First automatic driving | Second automatic driving |
|---|---|---|
| Operation of steering unit | ☑ —J1 | ☐ —J1 |
| Operation of transmission | ☑ —J2 | ☐ —J2 |
| Operation of brake | ☑ —J3 | ☑ —J3 |
| Operation of raising/lowering device | ☑ —J4 | ☑ —J4 |

CANCEL    OK

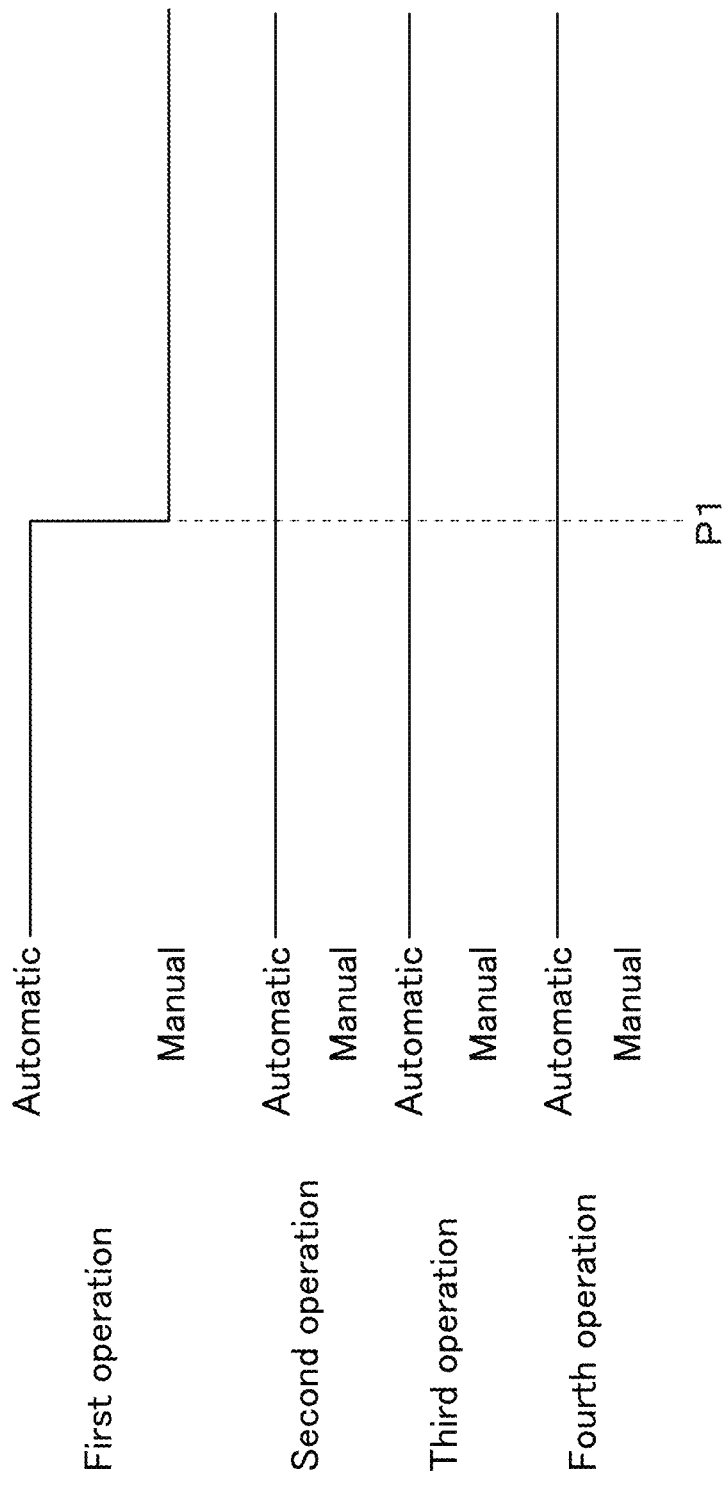

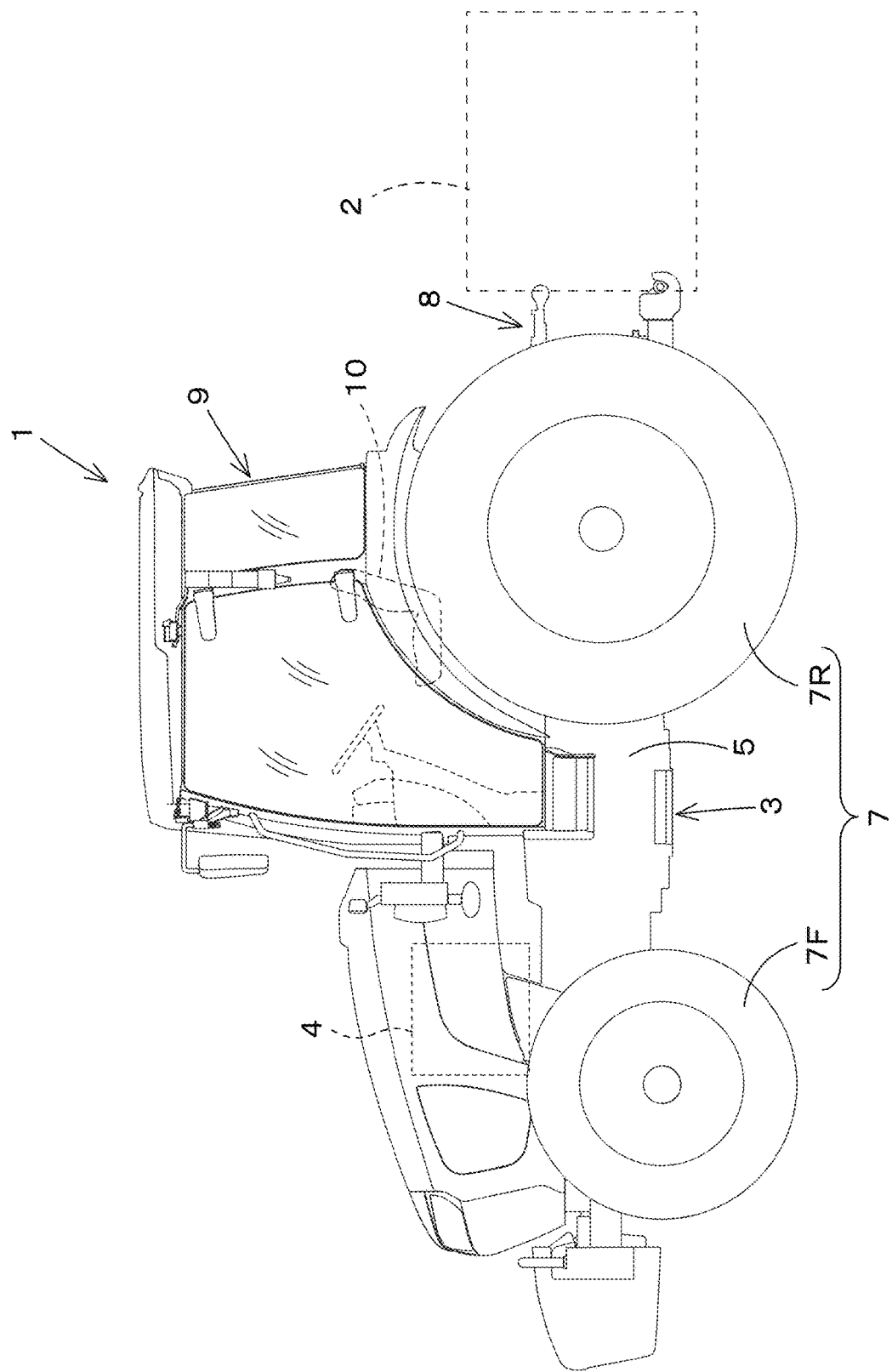

WORKING VEHICLE

CROSS REFERENCE TO RELATED APPLICATIONS

This application is a continuation application of International Application No. PCT/JP2020/047951, filed on Dec. 22, 2020, which claims the benefit of priority to Japanese Patent Application No. 2019-239888, filed on Dec. 27, 2019. The entire contents of each of these applications are hereby incorporated herein by reference.

BACKGROUND OF THE INVENTION

1. Field of the Invention

The present invention relates to, for example, a working vehicle such as a tractor.

2. Description of the Related Art

Japanese Unexamined Patent Application Publication No. 2017-47762 is known as a technique to cause a working machine to perform automatic travel. A traveling working machine of Japanese Unexamined Patent Application Publication No. 2017-47762 includes an automatic travel control unit which performs automatic travel, a manual travel control unit which performs manual travel, a machine body state detection unit which outputs machine body state information indicative of the state of a machine body, and an automatic travel management section which determines, on the basis of the machine body state information, whether to prohibit or allow the automatic travel performed by the automatic travel control unit and which outputs a control command for when automatic travel is prohibited, the control command deciding the control of the machine body after a command to prohibit the automatic travel is issued based on the machine body state information.

SUMMARY OF THE INVENTION

As described above, with the traveling working machine of Japanese Unexamined Patent Application Publication No. 2017-47762, upon detection of manual operation by the machine body state detection unit, the automatic travel management unit prohibits automatic travel and manual travel is performed. That is, according to Japanese Unexamined Patent Application Publication No. 2017-47762, the automatic travel is completely prohibited upon manual operation, and efficiency of work may decrease.

Preferred embodiments of the present invention provide working vehicles each capable of continuing automatic driving while allowing at least one of a plurality of types of operations to be performed manually.

Preferred embodiments of the present invention are described below.

A working vehicle includes a traveling vehicle body, and an automatic driving controller to perform first automatic driving in which a plurality of types of operations relating to the traveling vehicle body are performed automatically and second automatic driving in which at least one of the plurality of types of operations is set to be performed manually and the other one or more of the plurality of types of operations other than the at least one of the plurality of types of operations set to be performed manually continue to be performed automatically.

The working vehicle further includes a steering unit including a steering wheel to steer the traveling vehicle body. In the first automatic driving, the automatic driving controller is configured or programmed to automatically perform operation of the steering unit and one or more types of operations differing from the operation of the steering unit. In the second automatic driving, the automatic driving controller is configured or programmed to set the operation of the steering unit to be performed manually and to continue to automatically perform the one or more types of operations differing from the operation of the steering unit.

The working vehicle further includes a position detector to determine a vehicle body position which is a position of the traveling vehicle body. The automatic driving controller is configured or programmed to perform switching from the first automatic driving to the second automatic driving when, during the first automatic driving, the vehicle body position determined by the position detector is a predetermined position and the steering wheel is operated manually.

The automatic driving controller is configured or programmed to not perform the switching from the first automatic driving to the second automatic driving when, during the first automatic driving, the vehicle body position is not the predetermined position.

The automatic driving controller is configured or programmed to stop the automatic driving if an angle of steering by manual operation of the steering wheel is equal to or greater than a threshold.

The working vehicle further includes a linkage to link a working device to the traveling vehicle body. The linkage includes a raising/lowering device to raise and lower the working device. The automatic driving controller is configured or programmed to perform operation of causing the raising/lowering device to raise or lower the working device as one of the one or more types of operations in the first automatic driving and the second automatic driving.

The working vehicle further includes a transmission to change speed stages the transmission being provided on the traveling vehicle body. The automatic driving controller is configured or programmed to perform operation of causing the transmission to change speed stages as one of the one or more types of operations in the first automatic driving and the second automatic driving.

The working vehicle further includes a brake to perform braking, the brake being provided on the traveling vehicle body. The automatic driving controller is configured or programmed to perform operation of causing the brake to perform the braking as one of the one or more types of operations in the first automatic driving and the second automatic driving.

The working vehicle further includes a switch to manually switch between the first automatic driving and the second automatic driving.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 5A is a diagram showing an example of first automatic driving and second automatic driving.

FIG. 5B illustrates an example of a settings screen.

FIG. 5C illustrates an example of a settings screen.

FIG. 6 shows an example of switching between first automatic driving and second automatic driving.

FIG. 8 is a general side view of a tractor.

DETAILED DESCRIPTION OF THE PREFERRED EMBODIMENTS

Figure 1:
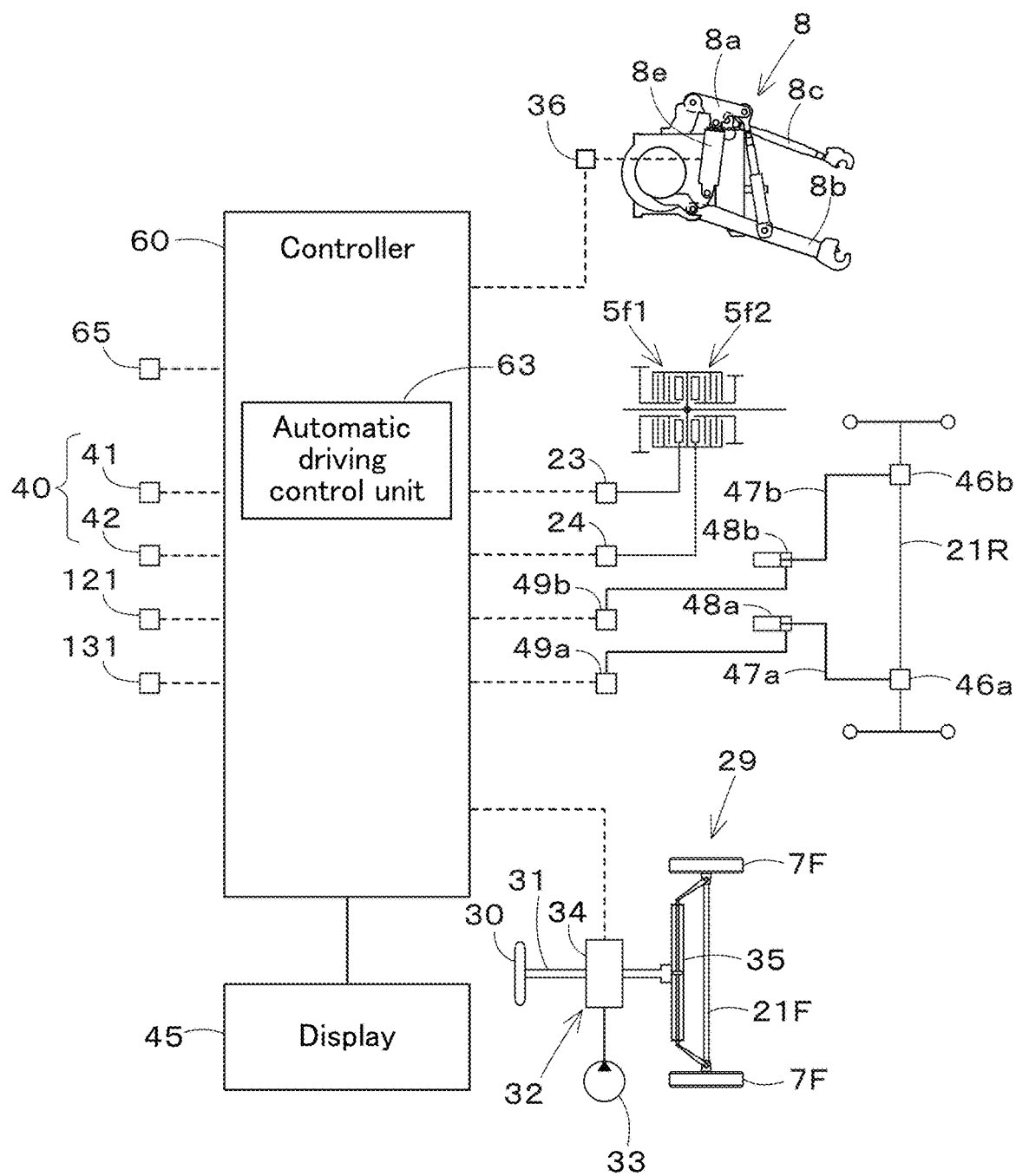
FIG. 1 is a block diagram of a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

FIG. 8 illustrates a tractor 1, which is an example of a working vehicle. The working vehicle is discussed using a tractor 1 as an example, but the working vehicle is not limited to a tractor and may be a rice transplanter or a combine, for example.

As illustrated in FIG. 8, the tractor 1 includes a traveling vehicle body 3 with a traveling device 7, a prime mover 4, and a transmission 5. The traveling device 7 includes front wheel(s) 7F and rear wheel(s) 7R. The front wheels 7F may be tire-shaped wheels and may be crawler-shaped wheels. The rear wheels 7R also may be tire-shaped wheels and may be crawler-shaped wheels. The prime mover 4 is a diesel engine, an electric motor, and/or the like. The transmission 5 is capable of changing driving force for the traveling device 7 by changing speed stages and switching the travel state of the traveling device 7 between forward and reverse traveling states. The machine body 3 is provided with a cabin 9, and the cabin 9 is provided with an operator's seat 10.

Furthermore, the traveling vehicle body 3 is provided with a linkage at the rear thereof. The linkage includes a swinging drawbar which links a working device 2 and the traveling vehicle body 3 and does not raise or lower the working device 2, a raising/lowering device 8 including a three-point linkage or the like and which raises and lowers the working device 2, or the like. The linkage can have the working device 2 attached thereto and detached therefrom. By linking the working device 2 to the linkage, it is possible for the traveling vehicle body 3 to tow the working device 2. The working device 2 is a cultivator for cultivation, a fertilizer spreader for spreading fertilizer, a transplanter for planting seedlings, a water spreader for spreading water, an agricultural chemical spreader for spreading agricultural chemicals, a seed spreader for spreading seeds, a mower for mowing grass or the like, a tedder for tedding grass or the like, a rake for raking grass or the like, a baler for baling grass or the like, a combined implement for a plurality of types of work, and/or the like.

Figure 2:
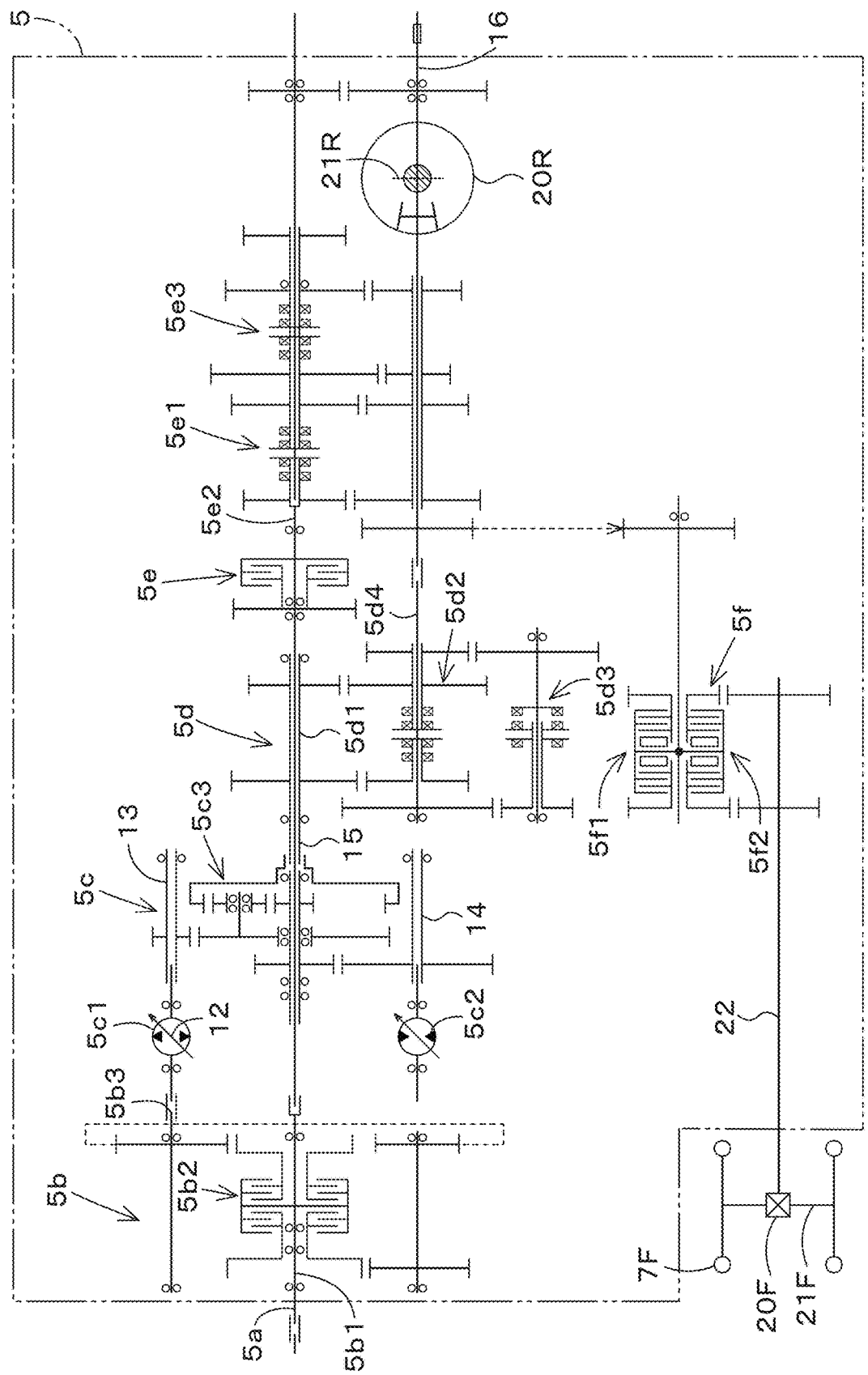
FIG. 2 illustrates a transmission.

As illustrated in FIG. 2, the transmission 5 includes a main shaft (propeller shaft) 5a, a shuttle unit 5b, a main transmission unit 5c, an auxiliary transmission unit 5d, a PTO power transmission unit 5e, and a front transmission unit 5f. The propeller shaft 5a is rotatably supported on a housing of the transmission 5, and power from a crankshaft of the prime mover 4 is transmitted to the propeller shaft 5a.

The shuttle unit 5b includes a shuttle shaft 5b1 and a forward/reverse switching unit 5b2. The shuttle shaft 5b1 receives power transmitted from the propeller shaft 5a. The forward/reverse switching unit 5b2 includes, for example, a hydraulic clutch and/or the like, and changes the direction of rotation of the shuttle shaft 5b1, i.e., switches the traveling state of the tractor 1 between forward and reverse traveling states, by selectively engaging or disengaging the hydraulic clutch.

The main transmission unit 5c is a continuously variable transmission mechanism which steplessly speed-changes power inputted thereto. The continuously variable transmission mechanism includes a hydraulic pump 5c1, a hydraulic motor 5c2, and a planetary gear mechanism 5c3. The hydraulic pump 5c1 is rotated by power from the output shaft 5b3 of the shuttle unit 5b. The hydraulic pump 5c1 is, for example, a variable displacement pump including a swash plate 12, and the flow rate of hydraulic fluid discharged from the hydraulic pump 5c1 can be changed by changing the angle of the swash plate 12 (swash plate angle). The hydraulic motor 5c2 is a motor which is rotated by hydraulic fluid discharged from the hydraulic pump 5c1 via a fluid passage circuit such as pipe(s). The rotation speed of the hydraulic motor 5c2 can be changed by changing the swash plate angle of the hydraulic pump 5c1 and/or power inputted into the hydraulic pump 5c1.

The planetary gear mechanism 5c3 includes a plurality of gears and power transmission shafts such as input and output shafts, and includes an input shaft 13 to receive power from the hydraulic pump 5c1, an input shaft 14 to receive power from the hydraulic motor 5c2, and an output shaft 15 to output power. The planetary gear mechanism 5c3 combines the power from the hydraulic pump 5c1 and the power from the hydraulic motor 5c2 and transmits the combined power to the output shaft 15.

Thus, with the main transmission unit 5c, power outputted to the auxiliary transmission unit 5d can be changed by changing the angle of the swash plate 12 of the hydraulic pump 5c1, the rotation speed of the prime mover 4, and/or the like. Note that, although the main transmission unit 5c includes a continuously variable transmission mechanism, the main transmission unit 5c may be a multistep transmission mechanism which changes speed stages using gears.

The auxiliary transmission unit 5d is a transmission mechanism which includes a plurality of multispeed gears and which speed-changes power. The auxiliary transmission unit 5d speed-changes the power inputted thereto from the output shaft 15 of the planetary gear mechanism 5c3 and outputs the speed-changed power, by appropriately changing the connection (meshing) of the plurality of gears. The auxiliary transmission unit 5d includes an input shaft 5d1, a first speed change clutch 5d2, a second speed change clutch 5d3, and an output shaft 5d4. The input shaft 5d1 is a shaft to receive power from the output shaft 15 of the planetary gear mechanism 5c3, and inputs the received power into the first speed change clutch 5d2 and the second speed change clutch 5d3 via gear(s) and/or the like. The received power is changed by switching engaged and disengaged states of each of the first and second speed change clutches 5d2 and 5d3, and is outputted to the output shaft 5d4. The power outputted to the output shaft 5d4 is transmitted to a rear wheel differential 20R. The rear wheel differential 20R rotatably supports a rear axle 21R on which the rear wheels 7R are attached.

The PTO power transmission unit 5e includes a PTO clutch 5e1, a PTO propeller shaft 5e2, and a PTO speed change unit 5e3. The PTO clutch 5e1 includes, for example, a hydraulic clutch and/or the like, and switching between the following states is achieved by engaging or disengaging the hydraulic clutch: a state in which power from the propeller shaft 5a is transmitted to the PTO propeller shaft 5e2; and a state in which power from the propeller shaft 5a is not transmitted to the PTO propeller shaft 5e2. The PTO speed change unit 5e3 includes speed change clutch(s) and a plurality of gears and/or the like, and changes power (rotation speed) inputted from the PTO propeller shaft 5e2 into the PTO speed change unit 5e3 and outputs the changed power. Power from the PTO speed change unit 5e3 is transmitted to a PTO shaft 16 via gear(s) and/or the like.

The front transmission unit 5f includes a first front speed change clutch 5f1 and a second front speed change clutch 5f2. The first front speed change clutch 5f1 and the second front speed change clutch 5f2 can receive power transmitted from the auxiliary transmission unit 5d, and, for example, receive power from the output shaft 5d4 via gear(s) and transmission shaft(s). Power from the first front speed change clutch 5f1 and the second front speed change clutch 5f2 can be transmitted to a front axle 21F via a front transmission shaft 22. Specifically, the front transmission shaft 22 is connected to a front wheel differential 20F, and the front wheel differential 20F rotatably supports the front axle 21F on which the front wheels 7F are attached.

The first front speed change clutch 5f1 and the second front speed change clutch 5f2 each include a hydraulic clutch and/or the like. As illustrated in FIG. 1, the first front speed change clutch 5f1 is connected with a fluid passage, and the fluid passage is connected to a control valve 23 to which hydraulic fluid discharged from a hydraulic pump is supplied. The first front speed change clutch 5f1 is selectively brought into an engaged state or a disengaged state depending on the degree of opening of the control valve 23. The second front speed change clutch 5f2 is connected with a fluid passage, and the fluid passage is connected to a control valve 24. The second front speed change clutch 5f2 is selectively brought into an engaged state or a disengaged state depending on the degree of opening of the control valve 24. The control valve 23 and the control valve 24 are each, for example, a two-way switching valve with a solenoid valve, and is selectively brought into a connected state or a disconnected state by energizing or deenergizing the solenoid of the solenoid valve.

When the first front speed change clutch 5f1 is in the disengaged state and the second front speed change clutch 5f2 is in the engaged state, power from the auxiliary transmission unit 5d is transmitted to the front wheels 7F via the second front speed change clutch 5f2. With this, four-wheel drive (4WD) in which the front wheels and the rear wheels are driven by power is achieved and the rotation speed is substantially the same between the front wheels and the rear wheels (4WD constant speed state). On the contrary, when the first front speed change clutch 5f1 is in the engaged state and the second front speed change clutch 5f2 is in the disengaged state, four-wheel drive is achieved and the rotation speed of the front wheels is greater than the rotation speed of the rear wheels (4WD speedup state). Furthermore, when the first front speed change clutch 5f1 and the second front speed change clutch 5f2 are in the disengaged state, power from the auxiliary transmission unit 5d is not transmitted to the front wheels 7F, and therefore two-wheel drive (2WD) in which the rear wheels 7R are driven by power results.

Figure 3:
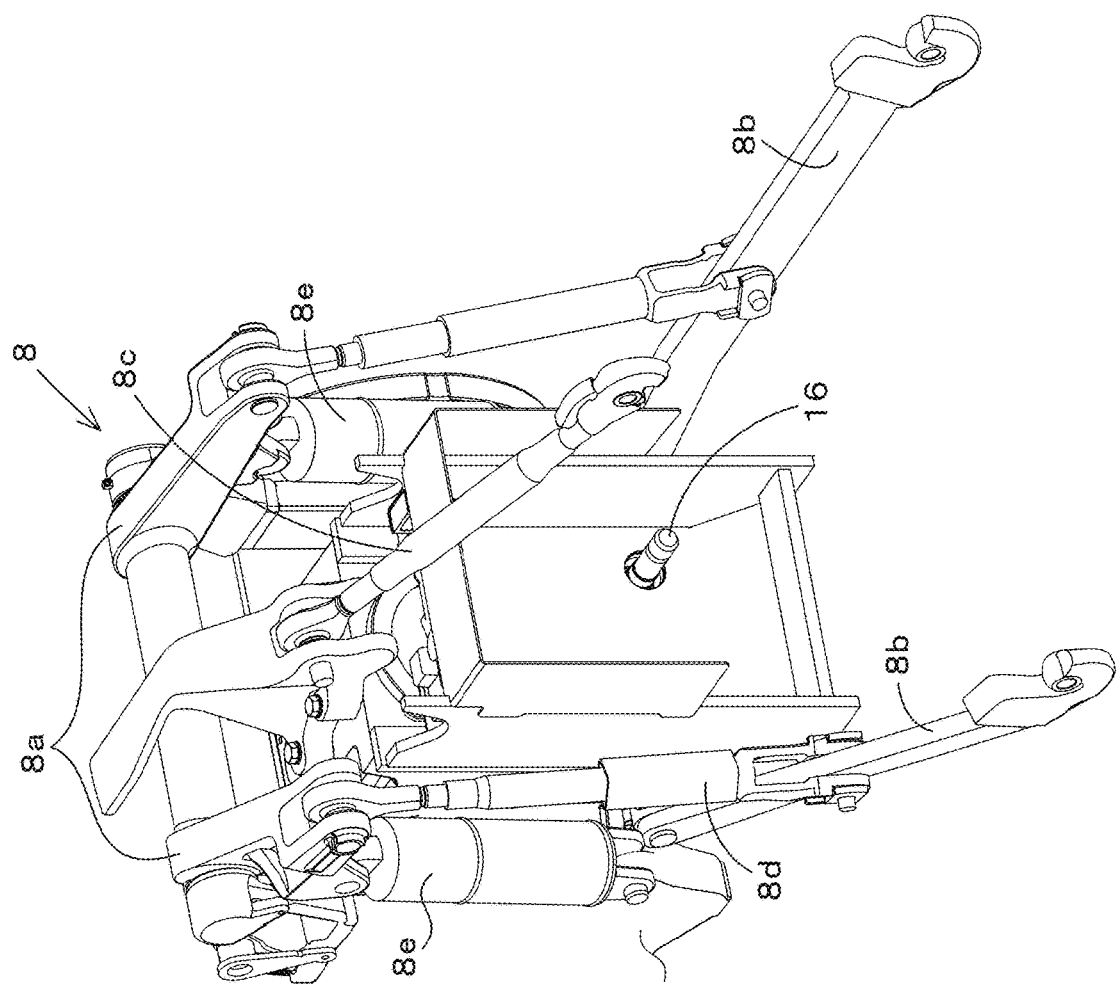
FIG. 3 illustrates a raising/lowering device.

As illustrated in FIG. 3, the raising/lowering device 8 includes lift arms 8a, lower links 8b, a top link 8c, lift rods 8d, and lift cylinders 8e. A front end of each lift arm 8a is supported on an upper rear portion of a case (transmission case) housing the transmission 5 such that the lift arm 8a is swingable up and down. The lift arm 8a is driven by a corresponding lift cylinder 8e to swing (raised or lowered). The lift cylinder 8e includes a hydraulic cylinder. The lift cylinder 8e is connected to a hydraulic pump via a control valve 36. The control valve 36 is a solenoid valve or the like to cause the lift cylinder 8e to extend and retract.

A front end of each lower link 8b is supported on a lower rear portion of the transmission 5 such that the lower link 8b is swingable up and down. A front end of the top link 8c is supported, at a position higher than the lower link 8b, on a rear portion of the transmission 5 such that the top link 8c is swingable up and down. Each lift rod 8d connects a corresponding lift arm 8a and a corresponding lower link 8b. The working device 2 is linked to rear portions of the lower links 8b and the top link 8c. When the lift cylinders 8e are driven (extend or retract), the lift arms 8a ascend or descend, and the lower links 8b connected to the lift arms 8a via the lift rods 8d also ascend or descend. With this, the working device 2 swings up or down (raised or lowered) about front portions of the lower links 8b.

As illustrated in FIG. 1, the tractor 1 includes a steering unit 29. The steering unit 29 includes a steering wheel 30, a rotation shaft (steering shaft) 31 which rotates as the steering wheel 30 rotates, and an assist mechanism (power steering mechanism) 32 to assist the steering wheel 30 in steering. The assist mechanism 32 includes a hydraulic pump 33, a control valve 34 to which hydraulic fluid discharged from the hydraulic pump 33 is supplied, and a steering cylinder 35 actuated by the control valve 34. The control valve 34 is a solenoid valve actuated based on a control signal. The control valve 34 is, for example, a three-way switching valve which achieves multi-position switching by movement of a spool or the like. The switching of the control valve 34 may also be achieved by operating the steering shaft 31. The steering cylinder 35 is connected to arms (knuckle arms) to change the orientation of the front wheels 7F.

Therefore, upon operation of the steering wheel 30, the position and the degree of opening of the control valve 34 change according to the steering wheel 30, and the steering cylinder 35 extends or retracts leftward or rightward according to the position and the degree of opening of the control valve 34, making it possible to change the steering direction of the front wheels 7F. Note that the foregoing steering unit 29 is an example, and the foregoing configuration does not imply limitation.

The tractor 1 includes a positioning device 40. The positioning device 40 is capable of detecting the position thereof (measured position information including latitude and longitude) by a satellite positioning system (positioning satellites) such as D-GPS, GPS, GLONASS, BeiDou, Galileo, and/or Michibiki. Specifically, the positioning device 40 receives satellite signals (positions of positioning satellites, time of transmission, correction information, and/or the like) from the positioning satellites, and detects the position (e.g., latitude and longitude) of the tractor 1, i.e., vehicle body position, on the basis of the satellite signals. The positioning device 40 includes a receiver 41 and an inertial measurement unit (IMU) 42. The receiver 41 is a device which includes an antenna and/or the like and which receives satellite signals from the positioning satellites, and is attached to the traveling vehicle body 3 separately from the inertial measurement unit 42. In the present preferred embodiment, the receiver 41 is attached to the traveling vehicle body 3, e.g., the cabin 9. Note that the location at which the receiver 41 is attached is not limited to those described in preferred embodiments.

The inertial measurement unit 42 includes an acceleration sensor to detect acceleration, a gyroscope sensor to detect angular velocity, and/or the like. The inertial measurement unit 42 is provided on the traveling vehicle body 3, for example, below the operator's seat 10, and is capable of detecting the roll angle, pitch angle, yaw angle, and/or the like of the traveling vehicle body 3.

As illustrated in FIG. 1, the tractor 1 includes a brake unit. The brake unit includes a left brake 46a and a right brake 46b. The left brake 46a and the right brake 46b are each a disc brake, and is capable of being selectively placed in a braking state in which braking works and a non-braking state in which braking is released. The left brake 46a is disposed at the left of the rear axle 21R, and the right brake 46b is disposed at the right of the rear axle 21R. For example, a left brake pedal and a right brake pedal are provided in the vicinity of the operator's seat 10. When an operator of the tractor 1 operates (presses) the left brake pedal, a left connection member 47a connected to the left brake pedal moves in a braking direction, bringing the left brake 46a into the braking state. When the operator operates (presses) the right brake pedal, a right connection member 47b connected to the right brake pedal moves in a braking direction, bringing the right brake 46b into the braking state.

The left connection member 47a has connected thereto a left hydraulic actuator 48a actuated by hydraulic fluid. The left hydraulic actuator 48a has connected thereto a left brake valve 49a via a fluid passage. The left connection member 47a can be moved in the braking direction by actuating the left hydraulic actuator 48a by the left brake valve 49a. The right connection member 47b has connected thereto a right hydraulic actuator 48b actuated by hydraulic fluid. The right hydraulic actuator 48b has connected thereto a right brake valve 49b via a fluid passage. The right connection member 47b can be moved in the braking direction by actuating the right hydraulic actuator 48b by the right brake valve 49b.

As such, the left brake 46a and the right brake 46b are capable of independently bringing the respective left and right rear wheels 7R into the braking state not only by operation of the left brake pedal and the right brake pedal but also by actuation of the left hydraulic actuator 48a and the right hydraulic actuator 48b.

As illustrated in FIG. 1, the tractor 1 includes a monitoring device 121. The monitoring device 121 is capable of detecting objects in the surrounding area of the tractor 1. The monitoring device 121 is attached to, for example, a side of the cabin 9 of the tractor 1, a front portion of the cabin 9 of the tractor 1, and/or the like. The monitoring device 121 is a camera (imaging device), a laser scanner, sonar, and/or the like. A camera (imaging device) captures an image of the surrounding area of the working device 2 using an image sensor such as SSC or SMOC and, when there is an object in the captured image, detects that object. A laser scanner emits laser and receives the laser reflected at an object, thereby detecting the object. Sonar emits sound waves and receives the sound waves reflected at an obstacle, thereby detecting the object.

Figure 7:
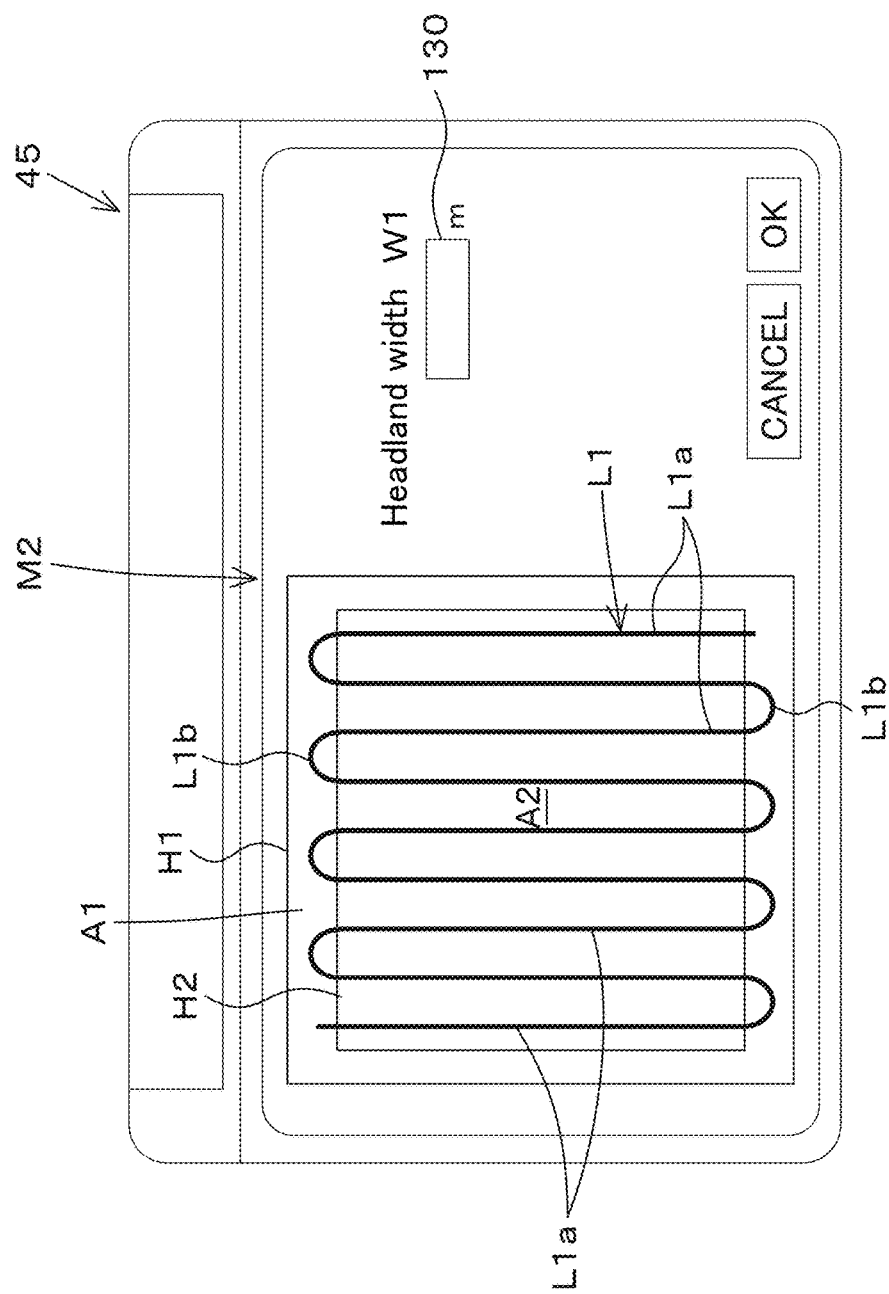
FIG. 7 illustrates an example of a settings screen.

As illustrated in FIG. 1, the tractor 1 includes a display 45. The display 45 is disposed in the vicinity of the operator's seat 10. The display 45 is capable of displaying various types of information relating to the tractor 1. As illustrated in FIG. 7, on the display 45, it is possible to set a headland area (turn area) A1 and a work area A2 on an agricultural field H1 where the tractor 1 does work. When a predetermined operation is performed on the display 45, a settings screen M2 is displayed as illustrated in FIG. 7. The area settings screen M2 displays a width input section 130 for input of a headland width W1 of the headland area A1. When the headland width W1 is set, an inner area defined by an outline (border) H2 deviating inward from an outline (border) H1 of the agricultural field by the headland width W1 is set as the work area A2, and an area between the outline (border) H2 defining the work area A2 and the outline (border) H1 of the agricultural field is set as the headland area A1. The settings of the headland area A1 and the work area A2 are examples, and do not imply limitation.

Furthermore, as illustrated in FIG. 7, on the display 45, it is possible to set a planned travel route L1 for automatic driving of the tractor 1. By making a predetermined operation on the display 45, it is possible to set the planned travel route L1 including straight route(s) L1a in which the tractor 1 is caused to travel straight and turn route(s) L1b.

As illustrated in FIG. 1, the tractor 1 includes a controller 60. The controller 60 is configured or programmed to control the traveling system of the tractor 1, control the working system of the tractor 1, and/or the like. The controller 60 has connected thereto a driving mode changeover switch 65. The driving mode changeover switch 65 is capable of being switched between ON and OFF. When the driving mode changeover switch 65 is ON, the controller 60 can be set to an automatic driving mode, and when the driving mode changeover switch 65 is OFF, the controller 60 can be set to a manual driving mode.

The controller 60 is configured or programmed to include an automatic driving control unit 63 to perform control relating to automatic driving of the tractor 1 (traveling vehicle body 3) on the basis of the planned travel route. The automatic driving control unit 63 includes electric/electronic circuit(s) provided in the controller 60, program(s) stored in a CPU and/or the like in the controller 60, and/or the like.

The automatic driving control unit 63 performs automatic driving of the traveling vehicle body 3. During the automatic driving, the automatic driving control unit 63 automatically performs a plurality of types of operations relating to the traveling vehicle body 3. For example, the automatic driving control unit 63 automatically performs the operation of the steering unit 29 (first operation), the operation of the transmission 5 (second operation), the operation of the brakes (or the brake unit) (third operation), the operation of the raising/lowering device 8 (fourth operation), and/or the like.

The automatic driving control unit 63 starts the automatic driving when in the automatic driving mode, and performs the operation of the steering unit 29 (first operation) so that the planned travel route L1 and the vehicle body position match each other.

Figure 4:
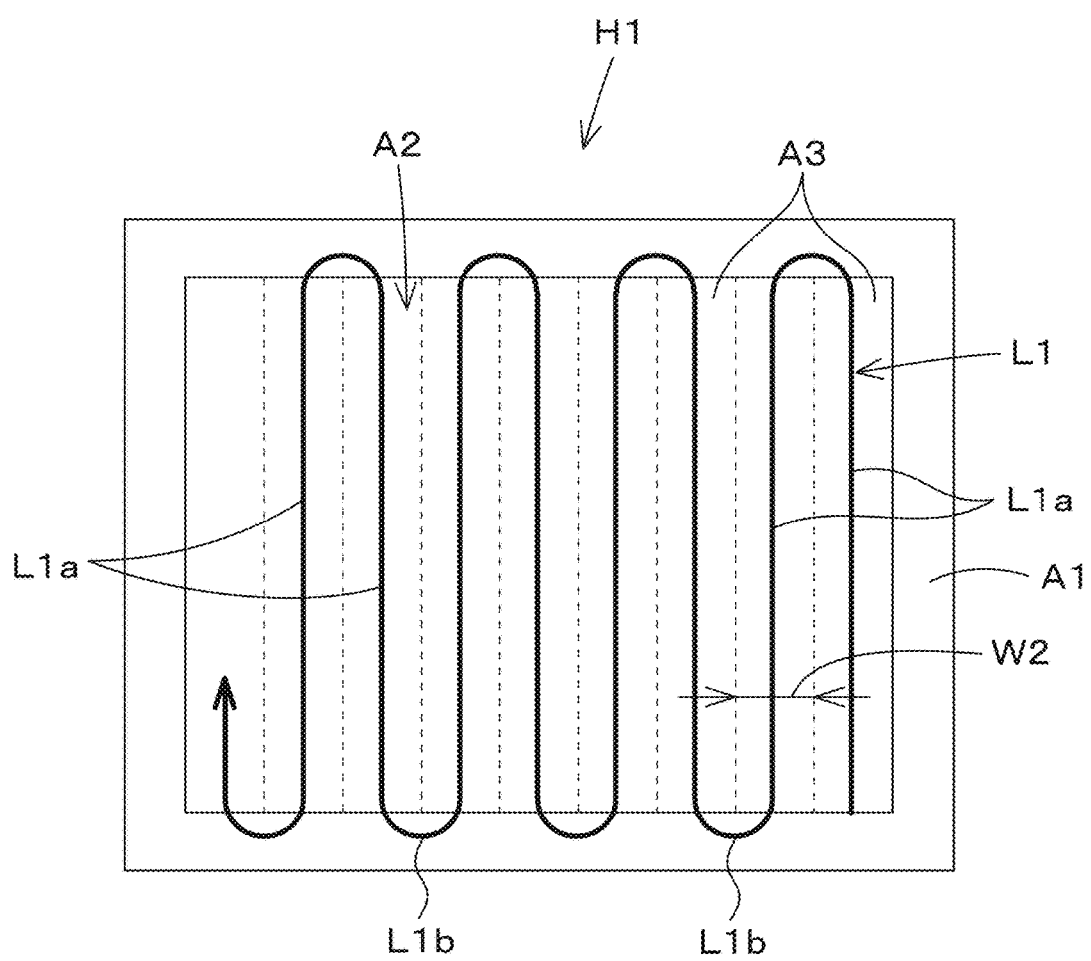
FIG. 4 is a diagram showing automatic travel and a planned travel route.

As illustrated in FIG. 4, for example, if the deviation between the vehicle body position of the tractor and the planned travel route L1 is less than a threshold, the automatic driving control unit 63 maintains the angle of rotation of the steering shaft (rotation shaft) 31 of the steering unit 29. If the deviation between the vehicle body position and the planned travel route L1 is equal to or greater than the threshold and the tractor 1 is positioned leftward of the planned travel route L1, the automatic driving control unit 63 causes the steering shaft 31 to rotate by outputting a control signal to the control valve 34 of the steering unit 29 so that the tractor 1 is steered right. If the deviation between the vehicle body position and the planned travel route L1 is equal to or greater than the threshold and the tractor 1 is positioned rightward of the planned travel route L1, the automatic driving control unit 63 causes the steering shaft 31 of the steering unit 29 to rotate by outputting a control signal to the control valve 34 of the steering unit 29 so that the tractor 1 is steered left.

Note that, although the angle of steering by the steering unit 29 is changed on the basis of the deviation between the vehicle body position and the planned travel route L1 in the above-described preferred embodiment, the automatic driving control unit 63 may, in the case where the direction of the planned travel route L1 and the travel direction of the tractor 1 (traveling vehicle body 3) (vehicle body heading direction) differ from each other, i.e., in the case where an angle of the vehicle body heading direction to the planned travel route L1 is equal to or greater than a threshold, set the angle of steering by outputting a control signal to the control valve 34 of the steering unit 29 so that the angle is zero (the vehicle body heading direction F1 matches the direction of the planned travel route L1). The automatic driving control unit 63 may set the final angle of steering for the automatic driving on the basis of an angle of steering determined based on the deviation (deviation in position) and an angle of steering determined based on directions (deviation in direction).

The automatic driving control unit 63 performs the operation of the transmission 5 (second operation) so that the actual vehicle speed of the tractor 1 (actual vehicle speed) matches a vehicle speed associated with the planned travel route L1 (target vehicle speed). For example, the automatic driving control unit 63 causes the actual vehicle speed and the target vehicle speed to match each other by changing the speed stage of the main transmission unit of the transmission 5 by outputting a control signal to an electric actuator to change the angle of the swash plate 12 of the hydraulic pump 5c1 and/or by changing the speed stage of the auxiliary transmission unit by outputting a control signal to, for example, hydraulic equipment (solenoid valve) to operate the first speed change clutch 5d2 and/or the second speed change clutch 5d3.

When the monitoring device 121 detects an obstacle or the like, the automatic driving control unit 63 performs the operation of the brakes (or the brake unit) (third operation) so that the tractor 1 stops before reaching the obstacle. For example, the automatic driving control unit 63 determines what the object detected by the monitoring device 121 is. If the object is an obstacle such as a human or an animal, the automatic driving control unit 63 performs braking by outputting a control signal to the left brake valve 49a and the right brake valve 49b. If the object is not an obstacle, the automatic driving control unit 63 does not perform braking.

The automatic driving control unit 63 performs the operation of the raising/lowering device 8 (fourth operation) according to the planned travel route L1. For example, assume a case in which the planned travel route L1 includes a straight route L1a and a turn route L1b. When the tractor 1 is located on the straight route L1a, the automatic driving control unit 63 places the working device 2 in a working posture by outputting a control signal to the control valve 36 to lower the working device 2. When the tractor 1 has reached the turn route L1b from the straight route L1a, the automatic driving control unit 63 places the working device 2 in a non-working posture by outputting a control signal to the control valve 36 to raise the working device 2. When the tractor 1 has reached the straight route L1a from the turn route L1b, the automatic driving control unit 63 again places the working device 2 in the working posture by outputting a control signal to the control valve 36 to lower the working device 2.

As such, during the automatic driving, the automatic driving control unit 63 automatically performs the operation of the steering unit 29 (first operation), the operation of the transmission 5 (second operation), the operation of the brakes (or the brake unit) (third operation), and/or the operation of the raising/lowering device 8 (fourth operation).

The automatic driving control unit 63 is capable of performing the following types of automatic driving: first automatic driving and second automatic driving. The first automatic driving is such that a plurality of types of operations pre-set for the automatic driving are all performed automatically. The second automatic driving is such that at least one of the plurality of types of operations pre-set for the automatic driving is set to be performed manually (allowed to be performed manually) and the other one or more of the plurality of types of operations other than the at least one of the plurality of types of operations set to be performed manually continue to be performed automatically.

As shown in FIG. 5A, for example, in the first automatic driving, the automatic driving control unit 63 automatically performs all the first operation, the second operation, the third operation, and the fourth operation, and, in the second automatic driving, the automatic driving control unit 63 sets the first operation to be performed manually and automatically performs the second operation, the third operation, and the fourth operation which are the other types of operation. Note that, as illustrated in FIG. 5B, a plurality of operation items to be performed automatically in the automatic driving can be selected by operating the display 45. For example, as illustrated in FIG. 5B, by selecting any of the plurality of operation items (automatic operation items) J1, J2, J3, J4 and the like displayed on an automatic driving settings screen M1, it is possible to set the selected item(s) as the automatic operation item(s) for the automatic driving.

The following description discusses switching between the first automatic driving and the second automatic driving in detail.

As shown in FIG. 6, at the time of start of automatic driving, the automatic driving control unit 63 performs the first automatic driving. That is, at the time of start of automatic driving, the first operation, the second operation, the third operation, and the fourth operation are all performed automatically. When an operator manually operates the steering wheel 30 during the first automatic driving as indicated by point in time P1 in FIG. 6, the automatic driving control unit 63 performs switching from the first automatic driving to the second automatic driving and performs the second automatic driving. That is, at the point in time P1, the automatic driving control unit 63 starts the second automatic driving in which the automatic driving control unit 63 sets the operation of the steering wheel 30 (steering unit 29) (first operation) to be performed manually and continues to automatically perform the other types of operations (the second operation, the third operation, and the fourth operation). In other words, when the operator manually performs the operation of the steering wheel 30 (steering unit 29) (first operation) which is one of the plurality of types of operations (the first operation, the second operation, the third operation, and the fourth operation), the automatic driving control unit 63 sets the first operation, which has been performed automatically, to be performed manually and continues to automatically perform the other types of operation.

It is noted that, although the switching from the first automatic driving to the second automatic driving is performed upon the first operation in the above-described preferred embodiment, the switching from the first automatic driving to the second automatic driving may be performed also when the tractor 1 (traveling vehicle body 3) is located at a predetermined position.

Specifically, assume a case in which, as illustrated in FIG. 4, a planned travel route L1 is set with respect to the headland area A1 and the work area A2 in the agricultural field H1. When the vehicle body position measured by the positioning device 40 during the first automatic driving is within the headland area A1 and the steering wheel 30 is manually operated, the automatic driving control unit 63 performs switching from the first automatic driving to the second automatic driving. On the contrary, when the vehicle body position measured by the positioning device 40 during the first automatic driving is within the work area A2 (i.e., is not a predetermined position) and the steering wheel 30 is operated manually, the automatic driving control unit 63 maintains the first automatic driving and does not perform the switching to the second automatic driving. That is, in the case where the vehicle position measured by the positioning device 40 during the first automatic driving is in the headland area A1, the automatic driving control unit 63 performs the second automatic driving when the operator performs manual operation, and, in the case where the vehicle position measured by the positioning device 40 during the first automatic driving is in the work area A2, the automatic driving control unit 63 does not perform the second automatic driving and maintains the first automatic driving in which all types of operations are performed automatically, even when the operator performs manual operation.

When the angle θ1 of steering by manual operation of the steering wheel 30 is less than a threshold, the automatic driving control unit 63 performs the switching from the first automatic driving to the second automatic driving. When the angle θ1 of steering is equal to or greater than the threshold, the automatic driving control unit 63 stops the automatic driving, i.e., stops the tractor 1 (traveling vehicle body 3).

Although the switching between the first automatic driving and the second automatic driving is automatically performed upon manual operation of the steering wheel 30 in the above-described preferred embodiment, the switching may be performed manually. The tractor 1 includes a switch 131. The switch 131 is movable between two positions, is located in the vicinity of the operator's seat 10, and is operable by the operator. When the switch 131 is placed in one of the two positions, the switching to the first automatic driving is performed. When the switch 131 is placed in the other of the two positions, the switching to the second automatic driving is performed. In the case where the switching to the second automatic driving is performed using the switch 131, the item(s) (manual operation items) set to be performed manually in the second automatic driving can be set on the display 45. For example, as illustrated in FIG. 5C, an automatic driving settings screen M3 can be displayed on the display 45. The settings screen M3 displays a plurality of operation items J1, J2, J3, J4, and the like, and it is possible to select operation item(s) for the first automatic driving and operation item(s) for the second automatic driving from the plurality of operation items.

A working vehicle 1 includes a traveling vehicle body 3, and an automatic driving controller 63 to perform first automatic driving in which a plurality of types of operations relating to the traveling vehicle body 3 are performed automatically and second automatic driving in which at least one of the plurality of types of operations is set to be performed manually and the other one or more of the plurality of types of operations other than the at least one of the plurality of types of operations set to be performed manually continue to be performed automatically. This makes it possible to change the first automatic driving to the second automatic driving, and therefore possible to automatically drive the working vehicle 1 while allowing at least one of the plurality of types of operations to be performed manually in the second automatic driving.

The working vehicle 1 further includes a steering unit 29 including a steering wheel 30 to steer the traveling vehicle body 3. In the first automatic driving, the automatic driving controller 63 is configured or programmed to automatically perform operation of the steering unit 29 and one or more types of operations differing from the operation of the steering unit 29. In the second automatic driving, the automatic driving controller 36 is configured or programmed to set the operation of the steering unit 29 to be performed manually and continue to automatically perform the one or more types of operations differing from the operation of the steering unit 29. With this, for example, when an operator manually operates the steering wheel 30 while the working vehicle 1 is driven automatically, the automatic steering of the traveling vehicle body 3 is switched to the operator's steering of the traveling vehicle body 3 and the other one or more types of operations continue to be performed automatically.

The working vehicle 1 further includes a position detector 40 to determine a vehicle body position which is a position of the traveling vehicle body 3. The automatic driving controller 63 is configured or programmed to perform switching from the first automatic driving to the second automatic driving when, during the first automatic driving, the vehicle body position determined by the position detector 40 is a predetermined position and the steering wheel 30 is operated manually. For example, it is possible, when the predetermined position is within an agricultural field but outside a work area, to allow the operation of the steering wheel 30 to be performed manually and to improve maneuverability outside the work area.

The automatic driving controller 63 is configured or programmed to not perform the switching from the first automatic driving to the second automatic driving when, during the first automatic driving, the vehicle body position is not the predetermined position. For example, it is possible, when the predetermined position is within an agricultural field and within a work area, to continue doing work in the automatic driving without allowing the operation of the steering wheel 30 to be performed manually.

The automatic driving controller 63 is configured or programmed to stop the automatic driving if an angle of steering by manual operation of the steering wheel 30 is equal to or greater than a threshold. This makes it possible, when, for example, the sudden operation of the steering wheel 30 is performed manually, to switch the automatic driving to manual driving or the like by stopping the automatic driving.

The working vehicle 1 further includes a linkage to link a working device 2 to the traveling vehicle body 3. The linkage includes a raising/lowering device 8 to raise and lower the working device 2. The automatic driving controller 63 is configured or programmed to perform operation of causing the raising/lowering device to raise or lower the working device 2 as one of the one or more types of operations in the first automatic driving and the second automatic driving. This makes it possible to automatically raise and lower the working device 2. For example, it is possible to cause the working device 2 to be raised and lowered automatically when, for example, the traveling vehicle body 3 turns or travels rearward.

The working vehicle 1 further includes a transmission 5 to change speed stages, the transmission 5 being provided on the traveling vehicle body 3. The automatic driving controller 63 is configured or programmed to perform operation of causing the transmission 5 to change speed stages as one of the one or more types of operations in the first automatic driving and the second automatic driving. This makes it possible to automatically cause the transmission 5 to change speed stages. For example, it is possible to automatically change speed stages when the traveling vehicle body 3 is traveling up a slope or down a slope in an agricultural field.

The working vehicle 1 further includes a brake 46a, 46b to perform braking, the brake 46a, 46b being provided on the traveling vehicle body 3. The automatic driving controller 63 is configured or programmed to perform operation of causing the brake 46a, 46b to perform the braking as one of the one or more types of operations in the first automatic driving and the second automatic driving. This makes it possible to achieve automatic braking.

The working vehicle 1 further includes a switch 131 to manually switch between the first automatic driving and the second automatic driving. This makes it possible to easily perform switching to the second automatic driving in which one or more of the plurality of types of operations are allowed to be performed manually, and possible to switch between the second automatic driving and the first automatic driving according to the type of work.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a traveling vehicle body;
   an automatic driving controller to perform first automatic driving in which a plurality of types of operations relating to the traveling vehicle body are performed automatically and second automatic driving in which at least one of the plurality of types of operations is set to be performed manually and the other one or more of the plurality of types of operations other than the at least one of the plurality of types of operations set to be performed manually continue to be performed automatically;
   a steering unit including a steering wheel to steer the traveling vehicle body; and
   a position detector to determine a vehicle body position which is a position of the traveling vehicle body; wherein
   in the first automatic driving, the automatic driving controller is configured or programmed to automatically perform operation of the steering unit and one or more types of operations differing from the operation of the steering unit;
   in the second automatic driving, the automatic driving controller is configured or programmed to set the operation of the steering unit to be performed manually and to continue to automatically perform the one or more types of operations differing from the operation of the steering unit; and
   the automatic driving controller is configured or programmed to perform switching from the first automatic driving to the second automatic driving when the vehicle body position determined by the position detector is a predetermined position in an agricultural field and the steering wheel is operated manually.

2. The working vehicle according to claim 1, wherein the automatic driving controller is configured or programmed to not perform the switching from the first automatic driving to the second automatic driving when the vehicle body position is not the predetermined position in the agricultural field.

3. The working vehicle according to claim 1, wherein the automatic driving controller is configured or programmed to stop the automatic driving if an angle of steering by manual operation of the steering wheel is equal to or greater than a threshold.

4. The working vehicle according to claim 1, further comprising a linkage to link a working device to the traveling vehicle body; wherein
   the linkage includes a raising/lowering device to raise and lower the working device; and
   the automatic driving controller is configured or programmed to perform operation of causing the raising/lowering device to raise or lower the working device as one of the one or more types of operations in the first automatic driving and the second automatic driving.

5. The working vehicle according to claim 1, further comprising a transmission to change speed stages, the transmission being provided on the traveling vehicle body; wherein
   the automatic driving controller is configured or programmed to perform operation of causing the transmission to change speed stages as one of the one or more types of operations in the first automatic driving and the second automatic driving.

6. The working vehicle according to claim 1, further comprising a brake to perform braking, the brake being provided on the traveling vehicle body; wherein
   the automatic driving controller is configured or programmed to perform operation of causing the brake to perform the braking as one of the one or more types of operations in the first automatic driving and the second automatic driving.

7. The working vehicle according to claim 1, further comprising a switch to manually switch between the first automatic driving and the second automatic driving.

8. The working vehicle according to claim 1, wherein the predetermined position in the agricultural field is a headland area of the agricultural field.

* * * * *